UNITED STATES PATENT OFFICE.

ALBERT C. BAUSCHER, OF LANARK, ILLINOIS, ASSIGNOR OF ONE-HALF TO HARRY HEPFER, OF SAME PLACE.

COMPOUND FOR FILLING COB PIPES.

SPECIFICATION forming part of Letters Patent No. 478,553, dated July 12, 1892.

Application filed December 24, 1891. Serial No. 416,087. (No specimens.)

*To all whom it may concern:*

Be it known that I, ALBERT C. BAUSCHER, a citizen of the United States, residing at Lanark, in the county of Carroll and State of Illinois, have invented a new and useful Compound for Filling Cob Pipes, of which the following is a specification.

This invention relates to pipe-filler compounds; and it has for its object to provide a paste for filling the pores of cob tobacco-pipes which will not of itself harden into the cob until after the same has been subjected to a high degree of heat, thus providing a filler which possesses superior advantages over the fillers now in use and completes a cob pipe more finished and neat in appearance and more durable in service than pipes made with fillers of the self-hardening type. Instead of hardening of itself in the outer and inner pores, as plaster-of-paris and other fillers do, the herein-described filler while baking in the oven soaks entirely through the cob and provides one having a nice and attractive dark color.

With these and other objects in view the invention consists in a filling compound composed of the following-named ingredients and mixed in the manner described: sirup, (New Orleans,) two parts; soap, (ordinary soft or laundry,) two parts; oil, (sperm or other suitable machine,) one part. The above ingredients are intimately combined together by boiling for a short period, and the resultant mixture is thickened to a suitable consistency by a suitable addition of ordinary whiting. The compound is now ready for application to the corn-cob and is placed thereon in any suitable manner. The filled cob is now placed in a bake-oven and baked until very hard, after which the cob is ready for use as an ordinary pipe. This filler provides a cob pipe that is unlike the unfilled pipes, which smoke bitter, for the same provides a pipe which is very sweet to the taste in smoking and quite pleasant to use, whereas the cob pipes that are filled with the plaster-of-paris and other fillers are not provided with the characteristics possessed by this filler, which are desirable points to be attained in the art.

Having thus described my invention, what I claim, and desire to secure by Letters Patent, is—

A pipe-filler compound or paste composed of sirup, soap, oil, and whiting, combined in substantially the proportions specified.

In testimony that I claim the foregoing as my own I have hereto affixed my signature in the presence of two witnesses.

ALBERT C. BAUSCHER.

Witnesses:
 H. C. HYDE,
 JOSEPH SCOTT.